(12) United States Patent
Christidis et al.

(10) Patent No.: US 10,657,526 B2
(45) Date of Patent: May 19, 2020

(54) SYSTEM AND METHOD TO DYNAMICALLY SETUP A PRIVATE SUB-BLOCKCHAIN BASED ON AGILITY OF TRANSACTION PROCESSING

(71) Applicant: International Business Machines Corporation, Armonk, NY (US)

(72) Inventors: Konstantinos Christidis, Durham, NC (US); Anna D. Derbakova, Durham, NC (US); Nitin Gaur, Austin, TX (US); Praveen Jayachandran, Bangalore (IN); Srinivasan Muralidharan, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 15/337,857

(22) Filed: Oct. 28, 2016

(65) Prior Publication Data

US 2018/0121909 A1    May 3, 2018

(51) Int. Cl.
*G06Q 20/36* (2012.01)
*H04L 9/32* (2006.01)
*G06Q 20/38* (2012.01)
*G06Q 20/06* (2012.01)

(52) U.S. Cl.
CPC ......... *G06Q 20/383* (2013.01); *G06Q 20/065* (2013.01); *G06Q 20/3678* (2013.01); *H04L 9/3236* (2013.01); *G06Q 2220/00* (2013.01); *H04L 2209/38* (2013.01)

(58) Field of Classification Search
CPC . G06Q 20/383; G06Q 20/065; G06Q 20/3678
USPC .......................................................... 705/74
See application file for complete search history.

(56) References Cited

U.S. PATENT DOCUMENTS

| 9,298,806 B1 | 3/2016 | Vessenes et al. |
| 2015/0379510 A1 | 12/2015 | Smith |
| 2016/0283920 A1 | 9/2016 | Fisher et al. |
| 2016/0342977 A1 | 11/2016 | Lam |
| 2019/0272393 A1 | 9/2019 | Rodriguez De Castro et al. |

FOREIGN PATENT DOCUMENTS

WO    WO2015171580 A1    11/2015

*Primary Examiner* — James D Nigh
*Assistant Examiner* — Yin Y Choi
(74) *Attorney, Agent, or Firm* — Scully, Scott, Murphy & Presser, P.C.; Tracey Robertson, Esq.

(57) ABSTRACT

The creation of a private sub-blockchain from a main blockchain is disclosed including receiving a request including a trust requirement and an agility requirement, receiving monitoring data from at least one of a plurality of validator nodes of the main blockchain, the monitoring data generated by monitoring the execution of transactions and the exchange of consensus messages by one or more of the plurality of validator nodes, determining a minimum number of validator nodes required to meet the trust requirement, identifying a subset of the plurality of validator nodes of the main blockchain that meets the agility requirement based on the received monitoring data, the subset containing at least the determined minimum number of validator nodes required to meet the trust requirement, and creating a private sub-blockchain of the main blockchain, the private sub-blockchain including the identified subset of the plurality of validator nodes of the main blockchain.

20 Claims, 6 Drawing Sheets

SYSTEM AND METHOD TO DYNAMICALLY SETUP A PRIVATE SUB-BLOCKCHAIN BASED ON AGILITY OF TRANSACTION PROCESSING

TECHNICAL FIELD

The present disclosure relates to blockchain technology.

BACKGROUND

Blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The proposed transaction may not always be valid, for example, it may be malformed (syntax errors), or it may constitute an attempt to perform a task for which the submitter is not authorized. Validation refers to filtering out invalid transactions and then deciding on the exact order for the remaining, valid, transactions to be appended to the blockchain as part of a new block.

Once ordered, the transactions are packaged into a new block, and the new block is voted on by the validator nodes associated with the blockchain to determine whether to add the new block to the blockchain. If a consensus to add the new block is reached, e.g., a threshold number of "for" votes, the new block may be appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

As enterprises begin to consume and deploy blockchains for use as transaction processing systems there is a growing need for fast, efficient, and trustworthy blockchain implementations. In an enterprise setting, a blockchain deployment must be manageable and scalable depending on the business needs. However, as the size of a blockchain increases or the number of validator nodes increases, the required computing time and effort both for generating new blocks, and reaching consensus also increases.

BRIEF SUMMARY

The system, method, and computer program product described herein provides ways to create a private sub-blockchain from a main blockchain that meets agility and trust requirements of a user.

In an aspect of the present disclosure, a method is disclosed. The method includes receiving a request to create a private sub-blockchain from a main blockchain. The request includes a trust requirement and an agility requirement for executing transactions and exchanging messages on the private sub-blockchain. The method further includes receiving monitoring data from at least one of a plurality of validator nodes of the main blockchain. The monitoring data is generated by monitoring the execution of transactions and the exchange of consensus messages by one or more of the plurality of validator nodes. The method further includes determining a minimum number of validator nodes required to meet the trust requirement and identifying a subset of the plurality of validator nodes of the main blockchain that meets the agility requirement based on the received monitoring data. The subset contains at least the determined minimum number of validator nodes required to meet the trust requirement. The method further includes creating a private sub-blockchain of the main blockchain including the identified subset of the plurality of validator nodes of the main blockchain.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The present disclose provides ways to implement private sub-blockchains off of a main blockchain. The private sub-blockchains leverages the existing fabric of the main blockchain while reducing the cost in time and computing power required by validators to reach a consensus and generate new blocks. The private sub-blockchain includes a subset of the validator nodes of the main blockchain. The subset may be chosen based on the agility of the validators in processing transactions in addition to trust and confidentiality requirements of the Enterprise. This private sub-blockchain allows for reduced consensus times for new transactions as compared to consensus times for the main blockchain. This is because the private sub-blockchain only requires consensus from the selected subset of the validator nodes rather than all of the validator nodes of the main blockchain. For example, the private sub-blockchain may include a minimal number of validator nodes required to achieve a particular trust and confidentiality criteria of a user. In some aspects, the trust and confidentiality criteria may include a minimum number of validator nodes to be used in the private sub-blockchain.

Figure 1:
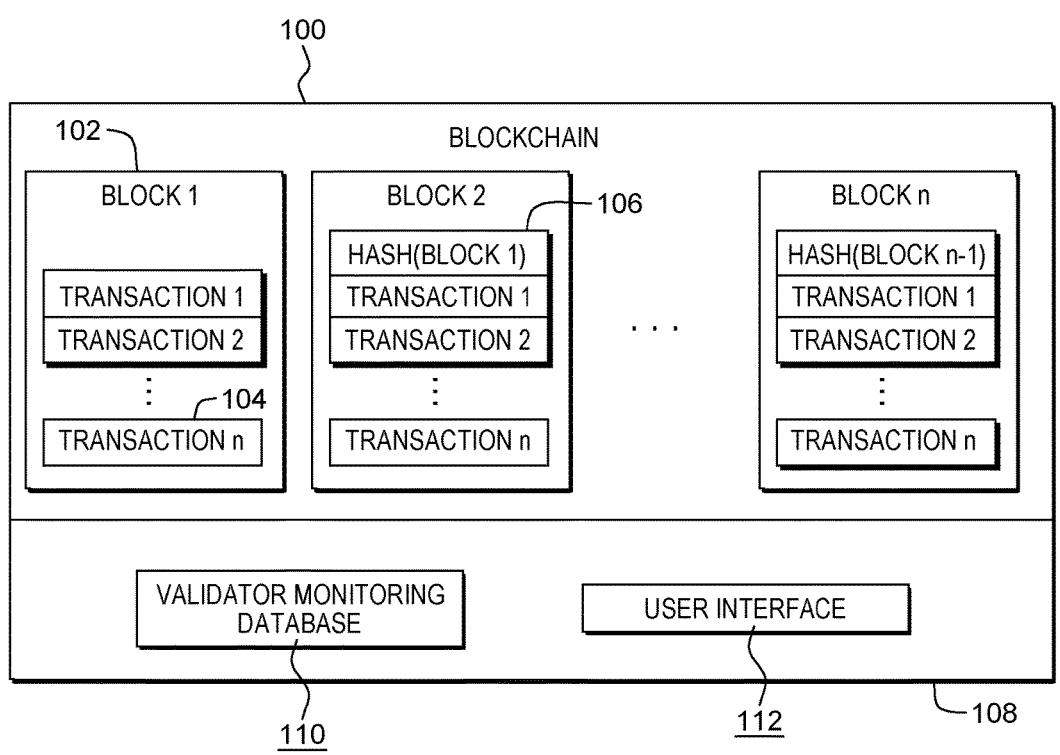
FIG. 1 is a system diagram illustrating a blockchain in accordance with an aspect of the present disclosure.

With reference now to FIG. 1, a blockchain 100 includes a plurality of data blocks 102. Each data block 102 is a data structure that includes data representing transactions 104, for example, smart contracts, payment receipts, or any other transaction. As described above, as new transactions 104 are submitted to the blockchain 100 and validated, additional data blocks 102 are generated and appended to the blockchain 100. Each new data block 102 also includes a hash 106 of the immediately previous data block 102. For example, data block 2 includes a hash of data block 1, data block n includes a hash of data block n−1, etc. Some non-limiting examples of blockchains include Bitcoin®, Ethereum®, OpenLedger™, or other similar blockchains.

Figure 2:
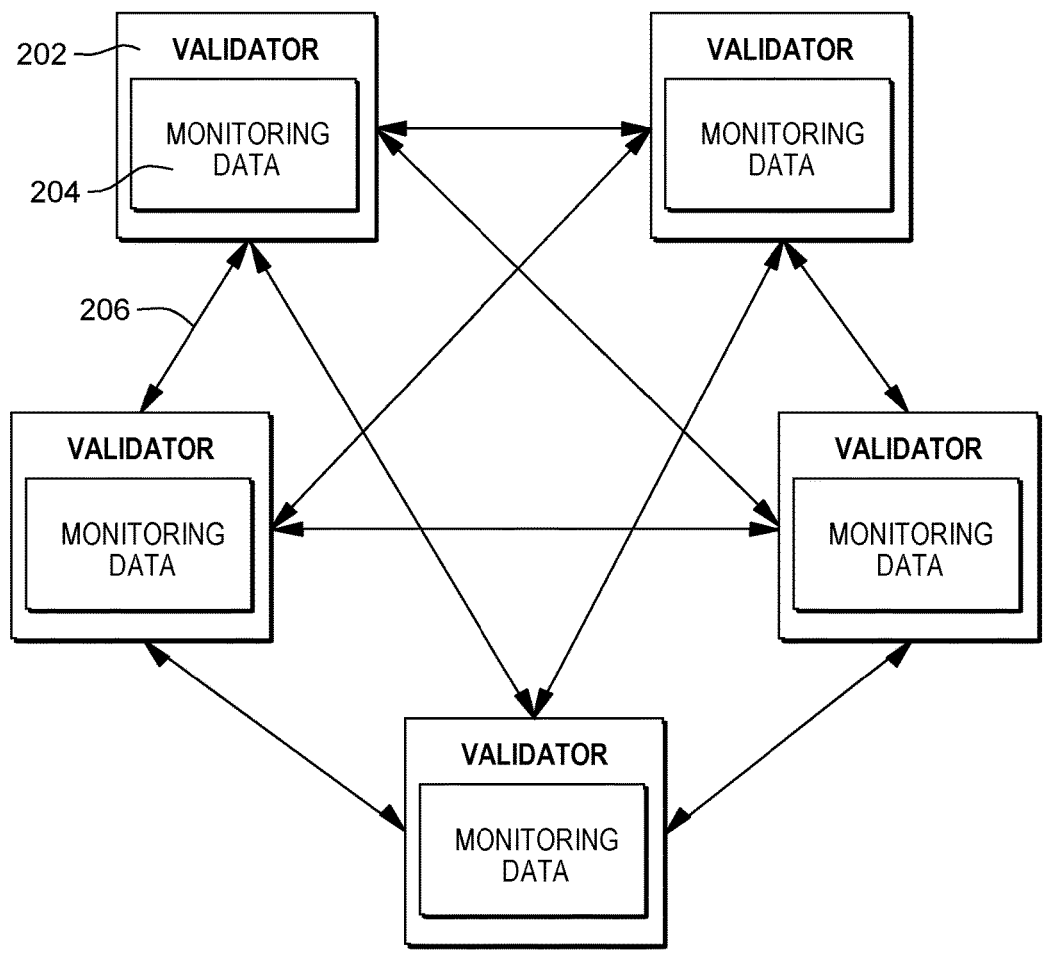
FIG. 2 is a system diagram illustrating validator nodes of the blockchain of FIG. 1 in accordance with an aspect of the present disclosure.

With reference now to FIG. 2, in a blockchain 100, any transactions 104 submitted to blockchain 100 are validated by a set of validator nodes 200 associated with blockchain 100. For example, transactions 104 may be transmitted to one or more of the validator nodes 202 and may be shared between the validator nodes 202 for validation and consensus. Each validator node 202 determines whether a transaction 104 is valid and whether the transaction 104 complies with the rules of the blockchain 100. The validator node 202 adds a plurality of the validated transactions 104 to a data block 102 and submits the data block 102 for consensus by the other validator nodes 202. The other validator nodes 202 then vote "for" or "against" appending the data block 102 containing the transactions 104 to the blockchain 100. A consensus of the set of validator nodes 202, e.g., a threshold number of identical votes "for" or "against", is required to allow or deny the data block 102 to be appended to the blockchain 100. Validator nodes 202 may communicate with one another via communication pathways 206, e.g., wired or wireless connections, over the internet, etc. to transmit and receive data. For example, as new data blocks 102 are generated by validator nodes 202, validator nodes 202 may communicate or share the new data blocks 102 and transmit and receive consensus messages via communication pathways 206.

Figure 3:
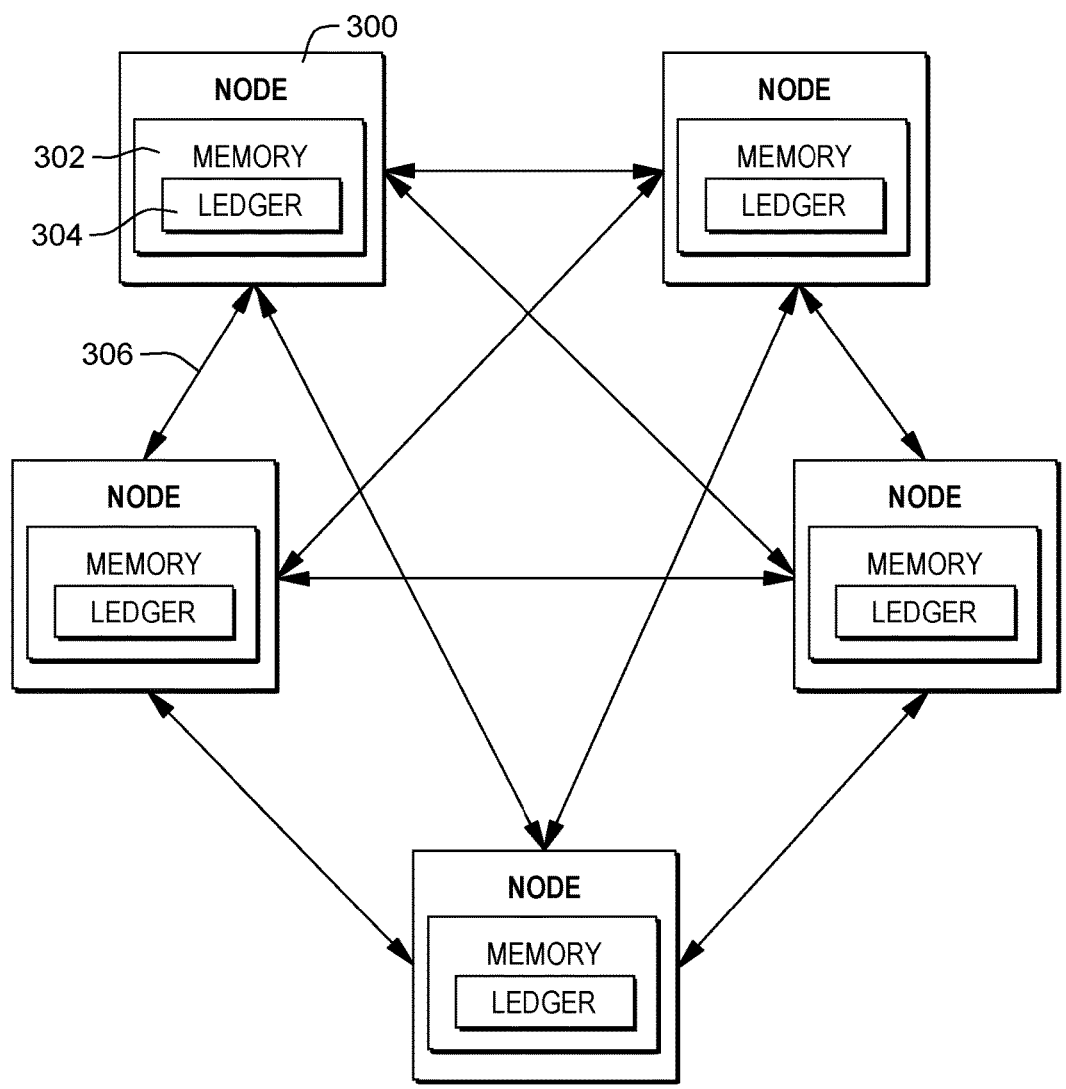
FIG. 3 is a system diagram illustrating nodes storing the ledger of the blockchain of FIG. 1 in accordance with an aspect of the present disclosure.

In some aspects, each validator node 202 may monitor the execution of transactions performed by the one or more other validator nodes 202 and may also or alternatively monitor the exchange of consensus messages between the one or more other validator nodes 202. The validator node 202 may generate monitoring data 204 based on the monitored executions and exchanges. In some aspects, the monitoring data 204 may be stored in memory of the validator node 202. In some aspects, the monitoring data 204 generated by each validator node 202 may be aggregated and stored, for example, in a validator monitoring database 110 (FIG. 1) of a private blockchain manager/assistance service (PBMS) 108 (FIG. 1) associated with the main blockchain 100. In some aspects, validator monitoring database 110 may be a distributed database that stored alongside blockchain 110, e.g., stored in memory of validator nodes 200 or nodes 300 (FIG. 3). For example, some or all of validator monitoring database 110 may be stored in each validator node 200 or node 300. In some aspects, validator monitoring database 110 may be stored in a centralized database that is accessible to each of validator nodes 202. PBMS 108 may run alongside blockchain 100 and may provide users with an interface to access the monitoring data 204 stored in validator monitoring database 110 and may allow users to select validator nodes for inclusion in a private sub-blockchain based on the stored monitoring data 204. In some aspects, each validator node 202 may have access to validator monitoring database 110 and may update validator monitoring database 110 based on new monitoring data 204 as validator nodes 202 continue to execute transactions and exchange consensus messages.

In some aspects, a validator node 202 may generate monitoring data only from those validator nodes 202 that it is in communication with. For example, validator node 202 may monitor the exchange of consensus messages and the execution of transactions between itself a neighboring validator node 202 of blockchain 100 (e.g., a neighboring validator node 202 that the validator node 202 communicates with during consensus) and may store the monitoring data 204 in memory of validator 202 or in database 108 for the adjacent validator node 202. The validator node 202 may use this monitoring data 204 to determine which adjacent validator nodes 202 are the fastest and most reliable neighbors. For example, in some aspects, monitoring data 204 may include the number of transactions or exchanges per second performed by a validator node 202.

With reference now to FIG. 3, in some aspects, blockchain 100 is stored in a decentralized manner on a plurality of nodes 300, e.g., computing devices located in one or more networks. Nodes 300 may each include memory 302 that stores at least a portion of a ledger 304 of blocks 102 of blockchain 100. Ledger 304 includes any data blocks 102 that have been validated and added to the blockchain 100. In some aspects, every node 300 may store the entire ledger 304. In some aspects, each node 300 may store a portion of ledger 304. In some aspects, some or all of nodes 300 may also be validator nodes 200. In some aspects, some or all of blockchain 100 may be stored in a centralized manner. Nodes 300 may communicate with one another via communication pathways 306, e.g., wired or wireless connections, over the internet, etc. to transmit and receive data related to ledger 304. For example, as new data blocks 102 are added to ledger 304, nodes 300 may communicate or share the new data blocks 102 via communication pathways 306.

Figure 4:
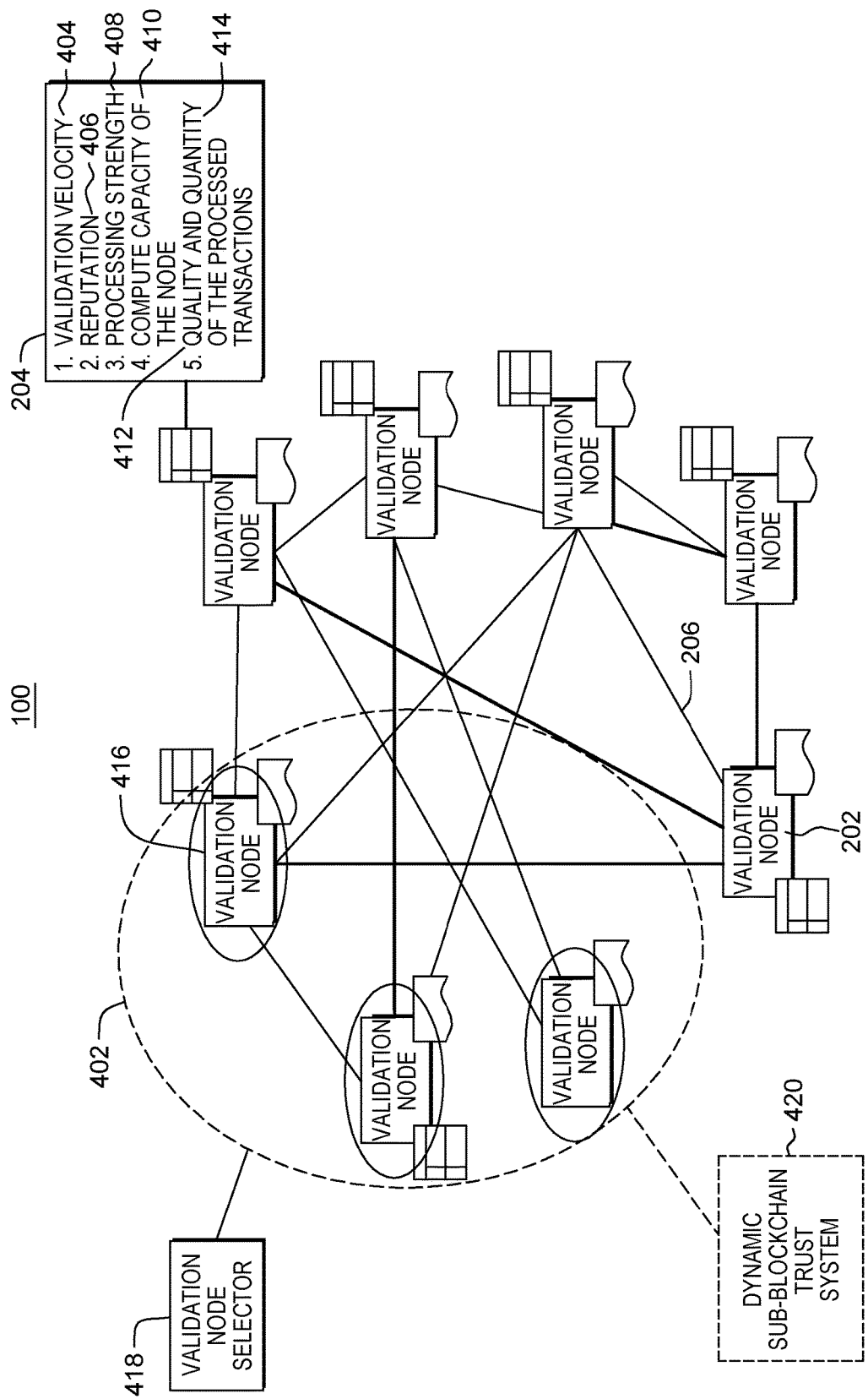
FIG. 4 is a system diagram illustrating a main blockchain and a private sub-blockchain in accordance with an aspect of the present disclosure.

With reference now to FIG. 4, monitoring data 204 may include information about a validator node 202 that may be relevant in determining whether to include the validator node 202 in a private sub-blockchain 402, e.g., a subset of the validator nodes 202 associated with blockchain 100. In some aspects, for example, monitoring data 204 may include a validation velocity 404 for the validator node 202 that indicates how fast the validator node 202 validates a transaction. In some aspects, for example, monitoring data 204 may include a reputation 406 for the validator node 202. For example, reputation 406 may indicate how often the consensus vote of the validator node 202 matches the outcome of the consensus, e.g., a quality of the validator node's consensus votes. For example, reputation 406 may include a percentage or fraction, e.g., 7/10 or 70% of the time the vote of the validator node 202 matches the consensus. In some aspects, the reputation 406 may include or be based on a total number of consensus votes performed by the validator node, for example, how many votes the validator node 202 has made over a lifetime of the validator node 202, over a predefined period of time, or other similar measurements of volume. In some aspects, reputation 406 may include a frequency of validations, e.g., how fast the validator node 202 validates transactions of a predetermined period of time. In some aspects, other similar metrics that can be used to gauge a reputation of a validator node 202 may be included or used to determine reputation 406. In some aspects, monitoring data 204 may include a processing strength 408 and/or compute capacity 410 of the validator node 202. The processing strength 408 and/or compute capacity 410 may be determined, for example, based on the number of validations and the ratio of validations that actually go into transaction processing, e.g., committed transactions that are captured as a part of validated transactions also found on the ledger 304 and in transaction logs associated with the ledger. In some aspects, monitoring data 204 may include a quality of the processed transactions 412 and/or quantity of the processed transactions 414 performed by the validator node 202. The quality of the processed transactions 412 may be based on, for example, the number of validations, the ratio of validation that goes into transaction processing, e.g., committed transactions, active participation and validation in relation to the peers, and other similar metrics of quality for processed transactions. In some aspects, any other monitoring data that may be relevant in determining whether to include a validator node 202 in the subset of validator nodes 202 that will form private sub-blockchain 402 may be included.

The monitoring data 204 may be used by validator nodes 202 or by PBMS 108 (FIG. 1) to identify a subset of validator nodes 416 that can achieve consensus and execute transactions rapidly. In some aspects, PBMS 108 may include a validator nodes selector 418 that allows a user to select the subset of validator nodes 416 for inclusion into private sub-blockchain 402. In some aspects, validator nodes selector 418 may select the subset of validator nodes 416 automatically in accordance with a criteria specified by the user. For example, validator nodes selector 418 may select a number of validator nodes sufficient to meet the trust and confidentiality criteria of the user, e.g., a minimum number of validator nodes, validator nodes run by trusted entities, etc., and validator nodes meeting user specified agility, e.g., processing and communication speed, requirements. In some aspects, the subset of validator nodes 416 may be selected by validator nodes selector 418 based on, for example, a cost of using a validator node (e.g., faster nodes cost more to use and the user may have a budget or other cost based criteria that influences validator node selection), frequency of transactions, reputation, a minimum number of nodes required to reach consensus as specified by the user, or other similar criteria. In some aspects, if validator nodes selector 418 is unable to find enough validator nodes meeting the agility, trust, and confidentiality criteria, one or more sub-standard validator nodes, e.g., nodes that have a slower speed, lack of processing power or capacity, lesser reputation, etc., may be included in the subset by validator nodes selector 418 to satisfy the minimum number specified by the user.

With reference FIGS. 2 and 4, in the main blockchain 100, one or more slow validator nodes 202 may slow down the entire network of validator nodes 202 since consensus may only be reached once each validator node 202 has voted. In some cases, whether a node is slow may depend on the available connections between it and its neighbors. For example, a subset blockchain A including a first plurality of validator nodes 202 may be fast. Likewise, a subset blockchain B including a second plurality of validator nodes 202 may be fast. But when one or more nodes from each of the subsets A and B are combined to form a third subset C, subset C may be slow. In some aspects, this may occur when, for example, the communication pathway between a validator node 202 of subset A and a validator node 202 of subset B has extra latency or packet loss. When the subsets A and B are separate, this latency or packet loss will not slow down the subsets, but when the validator nodes from each of A and B is combined to form subset C, this communication pathway may become active and may slow down the transaction speed and message exchange speed of subset C compared to subsets A and B.

In some aspects, the private sub-blockchain 402 of validator nodes 416 may initially perform at a desired transaction and consensus message exchange speed but, as an additional processing load of transactions and message exchanges are performed by one of the validator nodes 416, the validator node 416 may fall below a minimum speed threshold. In this case, the validator node 416 that is slowing sub-blockchain 402 down may be identified and replaced with other validator nodes 202 from the main blockchain 100 to achieve the minimum speed threshold, e.g., a threshold set by the user or system to maintain a required quality of service, for example, via an interface 112 of PBMS 108 (FIG. 1).

In some aspects, validator nodes 202 or subsets of validator nodes 202 may receive a score from PBMS 108 or from the other validator nodes 202. For example, the score may be based on the relative agility, e.g., speed, of each validator node 202 in executing transactions and exchanging consensus message. For example, in some aspects, each validator node 202 may have a score on a scale of 0 to 100. In some aspects, the score may reflect the transaction and exchange speed of the validator node, e.g., X number of transactions/exchanges per minute. In some aspects, for example, validator nodes 202 may be sorted into tiers based on the determined score. For example, validator nodes 202 having a score above a first threshold may be allocated to a first tier, validator nodes 202 having a score between the first threshold and a second threshold may be allocated to a second tier, etc. In some aspects the thresholds may be defined by speed, e.g., the first threshold may be fifty transactions/exchanges per second, the second threshold may be twenty-five transactions/exchanges per second, etc. If a validator node 202's score, e.g., speed, falls below or rises above a threshold, the validator node 202 may be upgraded or downgraded to another tier.

Referring back to FIGS. 1 and 4, in some aspects, a user of PBMS 108 may select a tier of validator nodes to use for the private sub-blockchain from a user interface 112. For example, the user may select to include only first tier validator nodes, only second tier validator nodes, a combination of first and second tier validator nodes, only validator nodes having at least a particular tier, e.g., at least a second tier may also include the first tier, or any other selection. In some aspects, the user may be charged an additional charge to utilize a tier that has validator nodes of a better score, e.g., faster speed. In some aspects, the user may be presented by a graphical user interface that allows the user to make the selections. In some aspects, the user may enter the selections via a command line interface (CLI) based user interface to query the system and select the criteria for use by PBMS 108 to identify validator nodes for addition to the private sub-blockchain.

In some aspects, after a private sub-blockchain 402 of validator nodes 416 has been selected and activated, the scores of the validator nodes 416 may be monitored by a dynamic sub-blockchain trust system 420 of the sub-blockchain 402. In some aspects, the dynamic sub-blockchain trust system 420 may be part of PBMS 108. In some aspects, if one or more of validator nodes 416 falls below a score threshold, e.g., has a reduced speed of transactions/exchanges per second below the threshold, dynamic sub-blockchain trust system 420 may automatically remove and replace the flagging validator nodes 416 with new validator node 202 from blockchain 100 that meets the score threshold or quality criteria set for the private sub-blockchain 402, e.g., from the same tier or meeting the speed requirements of the user. This allows the validator nodes 416 of the private sub-blockchain 402 to maintain the level and quality of service that the user of the private sub-blockchain 402 requires.

In some aspects, the user may specify how many validator nodes 416 the user requires to form the private sub-blockchain. For example, the user may select via user interface 112 a number of validator nodes 202 sufficient to meet trust and confidentiality requirements of the user. In some aspects, the trust and confidentiality requirement of the user may specify that the validator nodes 202 selected for the private sub-blockchain may only be run by a select group of trusted entities. For example, the user may specify that only validator nodes 202 run by certain corporate entities that are known to be trusted may be used to form the private sub-blockchain.

Figure 5:
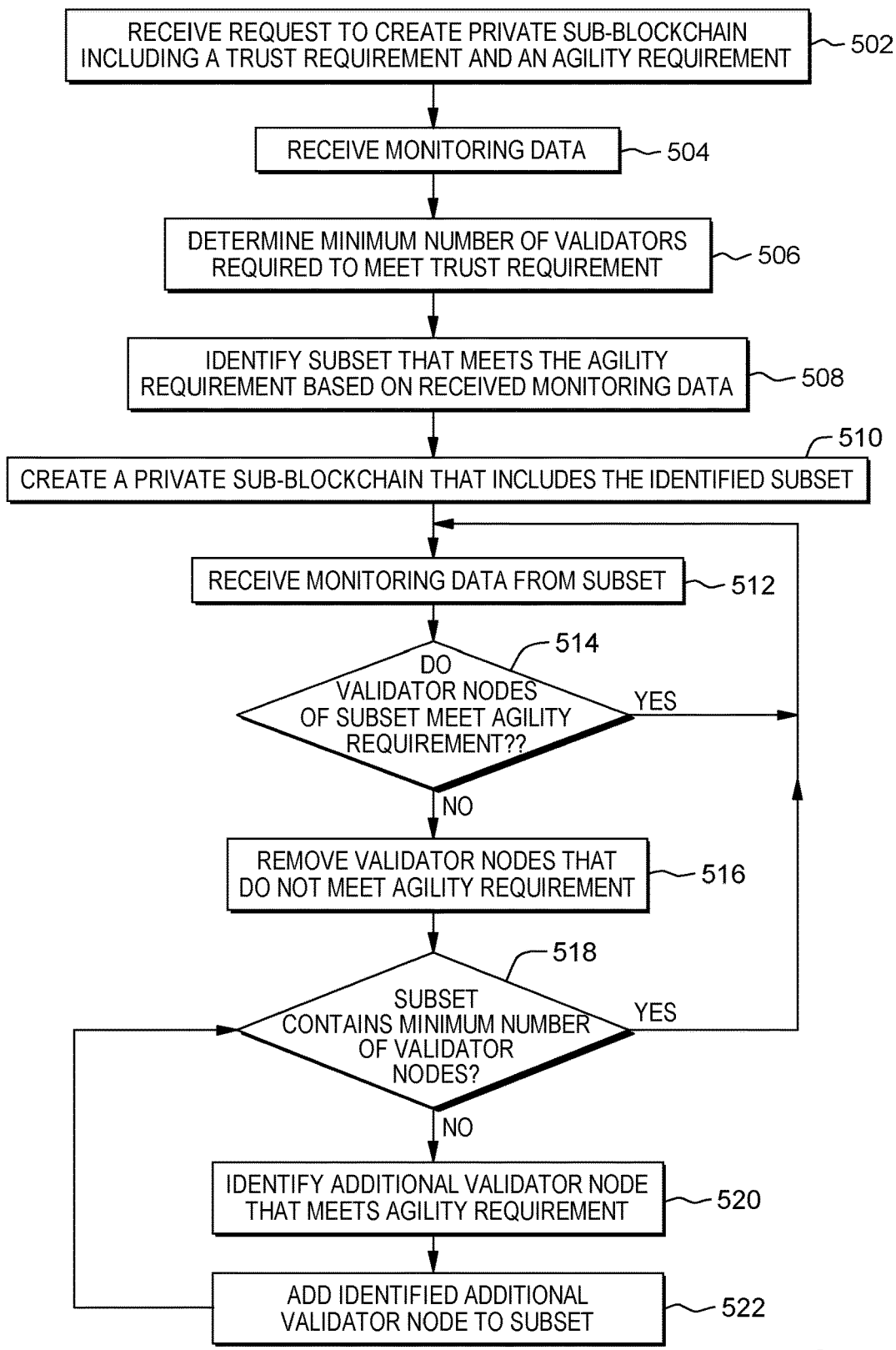
FIG. 5 is a flow chart of a method according to an embodiment of the present disclosure.

With reference now to FIG. 5, a method 500 for creating a private sub-blockchain of a main blockchain is disclosed.

At 502, a request to create a private sub-blockchain from a main blockchain is received, for example, by PBMS 108 (FIG. 1). The request may include a trust requirement and an agility requirement for executing transactions and exchanging messages on the private sub-blockchain. At 504, monitoring data is received from at least one of a plurality of validator nodes of the main blockchain, for example, by PBMS 108. The monitoring data is generated by monitoring the execution of transactions and the exchange of consensus messages by one or more of the plurality of validator nodes. The monitoring may be performed, for example, by one or more of the plurality of validator nodes. At 506, the minimum number of validator nodes required to meet the trust requirement is determined, for example, by PBMS 108. For example, the trust requirement received with the request may specify the minimum number of validator nodes. At 508, a subset of the plurality of validator nodes of the main blockchain that meets the agility requirement based on the received monitoring data is identified, for example, by PBMS 108. The subset contains at least the determined minimum number of validator nodes required to meet the trust requirement. At 510, a private sub-blockchain of the main blockchain is created, e.g., by PBMS 108, that includes the identified subset of the plurality of validator nodes of the main blockchain.

In some aspects, method 500 may continue at 512, where monitoring data is received from the subset of the plurality of validator nodes, for example, by PBMS 108. At 514, PBMS 108 determines whether all of the validator nodes of the subset still meet the agility requirement. For example, if a validator node gets overburdened with other processing for the main blockchain, the validator node may fall below the agility requirement. The determination may be made based on the received monitoring data from the subset of the plurality of validator nodes. If the validator nodes of the subset meet the agility requirement the method 500, monitoring of the subset may continue by returning to 512. If any of the validator nodes of the subset do not meet the agility requirement, the method proceeds to 516 where any validator nodes of the subset that no longer meets the agility requirement from the subset are removed, for example, by PBMS 108.

In some aspects, method 500 may further continue at 518 where in response to removing the validator nodes of the subset that no longer meet the agility requirement, PBMS 108 may determine whether or not the subset contains at least the determined minimum number of validator nodes required to meet the trust requirement. If the subset contains the minimum number of validator nodes, method 500 may continue monitoring the subset by returning to 512. If the subset does not contain the minimum number of validator nodes, the method proceeds to 520 where at least one additional validator node of the main blockchain that meets the agility requirement may be identified, for example, by PBMS 108. At 522, the identified at least one additional validator node may be added to the subset, for example, by PBMS 108. The method may then return to 518 to determine whether the subset now contains the minimum number of validator nodes and may continue repeating steps 520 and 522 until the minimum is met.

Figure 6:
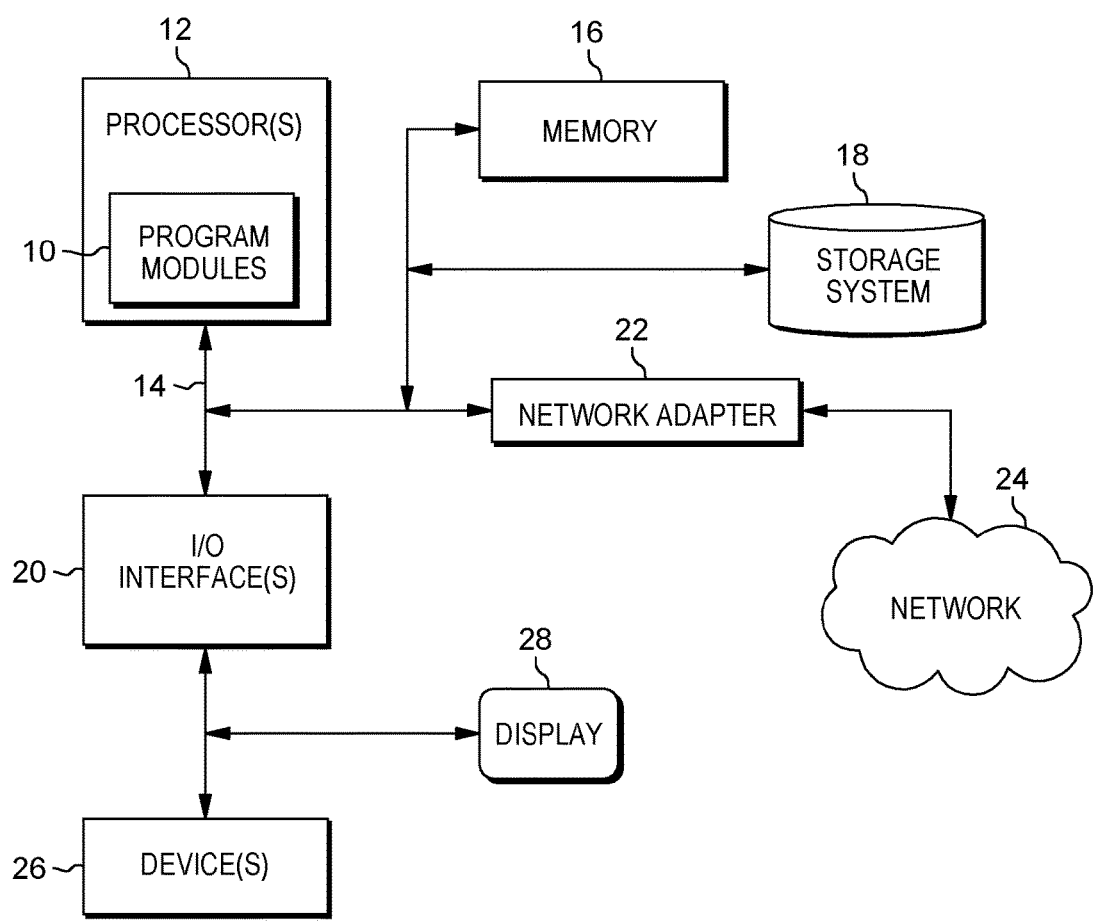
FIG. 6 is an exemplary block diagram of a computer system in which processes involved in the system, method, and computer program product described herein may be implemented.

FIG. 6 illustrates a schematic of an example computer or processing system that may implement any portion of blockchain 100, validators 200, nodes 300, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor, comprising:

receiving a request to create a private sub-blockchain from a main blockchain, the request including a trust requirement and an agility requirement for executing transactions and exchanging messages on the private sub-blockchain;

receiving monitoring data from at least one of a plurality of validator nodes of the main blockchain, the monitoring data generated by monitoring the execution of transactions and the exchange of consensus messages by one or more of the plurality of validator nodes;

determining a minimum number of validator nodes required to meet the trust requirement;

identifying a subset of the plurality of validator nodes of the main blockchain that meets the agility requirement based on the received monitoring data, the subset containing at least the determined minimum number of validator nodes required to meet the trust requirement; and creating a private sub-blockchain of the main blockchain, the private sub-blockchain including the identified subset of the plurality of validator nodes of the main blockchain.

2. The method of claim 1, wherein the monitoring data is stored on at least one of the validator nodes.

3. The method of claim 1, wherein the monitoring data is stored in a decentralized database associated with the plurality of validator nodes.

4. The method of claim 1, further comprising:

receiving monitoring data from the subset of the plurality of validator nodes;

determining, based on the received monitoring data from the subset of the plurality of validator nodes that at least one of the validator nodes of the subset no longer meets the agility requirement; and removing the at least one of the validator nodes of the subset that no longer meets the agility requirement from the subset.

5. The method of claim 3, further comprising:
in response to removing the at least one of the validator nodes of the subset that no longer meets the agility requirement, determining that the subset does not contain at least the determined minimum number of validator nodes required to meet the trust requirement; and
identifying at least one additional validator node of the main blockchain that meets the agility requirement; and
adding the at least one additional validator node to the subset.

6. The method of claim 1, wherein the agility requirement comprises a required speed for executing the transactions.

7. The method of claim 1, wherein the monitoring data comprises at least one of a reputation of a validator node, a processing strength of a validator node, a quality of the validation performed by a validator node, a quantity of the validation performed by a validator node, a processing capability of a validator node, a transaction execution speed of the validator node, and a consensus message exchange speed of a validator node.

8. A system, comprising:
at least one hardware processor configured to:
receive a request to create a private sub-blockchain from a main blockchain, the request including a trust requirement and an agility requirement for executing transactions and exchanging messages on the private sub-blockchain;
receive monitoring data from at least one of a plurality of validator nodes of the main blockchain, the monitoring data generated by monitoring the execution of transactions and the exchange of consensus messages by one or more of the plurality of validator nodes;
determine a minimum number of validator nodes required to meet the trust requirement;
identify a subset of the plurality of validator nodes of the main blockchain that meets the agility requirement based on the received monitoring data, the subset containing at least the determined minimum number of validator nodes required to meet the trust requirement; and
create a private sub-blockchain of the main blockchain, the private sub-blockchain including the identified subset of the plurality of validator nodes of the main blockchain.

9. The system of claim 8, wherein the monitoring data is stored on at least one of the validator nodes.

10. The system of claim 8, wherein the monitoring data is stored in a decentralized database associated with the plurality of validator nodes.

11. The system of claim 8, wherein the at least one hardware processor is further configured to:
receive monitoring data from the subset of the plurality of validator nodes;
determine, based on the received monitoring data from the subset of the plurality of validator nodes that at least one of the validator nodes of the subset no longer meets the agility requirement; and
remove the at least one of the validator nodes of the subset that no longer meets the agility requirement from the subset.

12. The system of claim 11, wherein the at least one hardware processor is further configured to:
in response to removing the at least one of the validator nodes of the subset that no longer meets the agility requirement, determine that the subset does not contain at least the determined minimum number of validator nodes required to meet the trust requirement; and
identify at least one additional validator node of the main blockchain that meets the agility requirement; and
add the at least one additional validator node to the subset.

13. The system of claim 8, wherein the agility requirement comprises a required speed for executing the transactions.

14. The system of claim 8, wherein the monitoring data comprises at least one of a reputation of a validator node, a processing strength of a validator node, a quality of the validation performed by a validator node, a quantity of the validation performed by a validator node, a processing capability of a validator node, a transaction execution speed of the validator node, and a consensus message exchange speed of a validator node.

15. A non-transitory computer readable medium comprising instructions that when executed by at least one hardware processor, configure the at least one hardware processor to:
receive a request to create a private sub-blockchain from a main blockchain, the request including a trust requirement and an agility requirement for executing transactions and exchanging messages on the private sub-blockchain;
receive monitoring data from at least one of a plurality of validator nodes of the main blockchain, the monitoring data generated by monitoring the execution of transactions and the exchange of consensus messages by one or more of the plurality of validator nodes;
determine a minimum number of validator nodes required to meet the trust requirement;
identify a subset of the plurality of validator nodes of the main blockchain that meets the agility requirement based on the received monitoring data, the subset containing at least the determined minimum number of validator nodes required to meet the trust requirement; and
create a private sub-blockchain of the main blockchain, the private sub-blockchain including the identified subset of the plurality of validator nodes of the main blockchain.

16. The non-transitory computer readable medium of claim 15, wherein the monitoring data is stored on at least one of the validator nodes.

17. The non-transitory computer readable medium of claim 15, wherein the monitoring data is stored in a decentralized database associated with the plurality of validator nodes.

18. The non-transitory computer readable medium of claim 15, wherein the at least one hardware processor is further configured to:
receive monitoring data from the subset of the plurality of validator nodes;
determine, based on the received monitoring data from the subset of the plurality of validator nodes that at least one of the validator nodes of the subset no longer meets the agility requirement; and
remove the at least one of the validator nodes of the subset that no longer meets the agility requirement from the subset.

19. The non-transitory computer readable medium of claim 18, wherein the at least one hardware processor is further configured to:
in response to removing the at least one of the validator nodes of the subset that no longer meets the agility requirement, determine that the subset does not contain at least the determined minimum number of validator nodes required to meet the trust requirement; and identify at least one additional validator node of the main blockchain that meets the agility requirement; and add the at least one additional validator node to the subset.

20. The non-transitory computer readable medium of claim 15, wherein the agility requirement comprises a required speed for executing the transactions.

* * * * *